Patented Feb. 20, 1940

2,191,361

UNITED STATES PATENT OFFICE 2,191,361

MANUFACTURE OF AMINO-TRIAZINE

Gustave Widmer, Willi Fisch, and Josef Jakl, Basel, Switzerland, assignors, by mesne assignments, to Ciba Products Corporation, Dover, Del., a corporation of Delaware No Drawing. Application December 2, 1936, Serial No. 113,936. In Switzerland December 14, 1935

12 Claims. (Cl. 260—24)

The present invention relates to the manufacture of 2.4.6-triamino-1.3.5-triazine (melamine) from cyan derivatives of ammonia of the formula $(CN_2H_2)_x$, wherein $x$ means a whole number not greater than 2, specifically from dicyandiamide or cyanamide, in the presence of ammonia.

It is known that melamine (2.4.6-triamino-1.3.5-triazine) can be made from dicyandiamide with a yield of 26 per cent. or 35 per cent. respectively by heating dicyandiamide in an autoclave, with about an equal weight of aqueous ammonia, to 160° or 120° C. respectively.

The present invention is based on the observation that the yield of melamine can be essentially increased by considerably diminishing the proportion of the aqueous ammonia or water used, or working mainly with anhydrous ammonia. Thus, by diminishing the proportion of water or the proportion of aqueous ammonia to 10 per cent. or less of the dicyandiamide used, an increase of the yield of melamine to about double that of the former maximum is obtained.

In view of the strongly exothermic nature of the reaction it is advantageous to control the temperature by use of a diluent or heat buffer. As such may very well be used a liquid or a solid substance which is anhydrous or poor in water, for example benzine, methyl alcohol, ethyl alcohol, dioxane, nitrobenzene, iron powder, copper bronze, zinc powder, magnesium oxide, asbestine, or the like. Also liquid ammonia can be used for this purpose and has proved quite particularly useful. In this manner nearly theoretical yields of melamine can be obtained.

In order to obtain the above mentioned good yields the reaction should be conducted at temperatures above 100° C., the upper limit being at about 300° C. The most favorable temperatures lie between 120 and 200° C.

The melamine may be obtained in a pure form from the mixture produced by the reaction by crystallization from water or by sublimation.

Cyanamide may also be used in analogous manner for making melamine since, as is known, it is easily transformed into dicyandiamide, particularly in the heat.

Even commercial calcium cyanamide may serve after conversion into dicyandiamide or cyanamide or a mixture of these for the production of melamine.

The yields of melamine given in the following examples, which illustrate the invention, relate to pure melamine obtained from the reaction mixture and directly weighed. Recrystallization is carried out with boiling water, which in the course of cooling receives an addition of some caustic soda solution in order to prevent separation of any ammeline which may be present.

The dicyandiamide used in the following examples, where not otherwise stated, is the commercial product.

Example 1

200 grams of dicyandiamide are mixed with 20 cc. of concentrated aqueous ammonia and the mixture is heated in a bomb for 12 hours at 135° C. The final product contains 60 per cent. of melamine calculated on the dicyandiamide used.

Example 2

7 kilos of dicyandiamide and 6 litres of methyl alcohol are mixed in a stirring autoclave and into the mixture ammonia gas is forced under a pressure of 3 atmospheres; the mixture is then heated for 12 hours at 150° C., the temperature being raised each hour by 10° from 100° upwards. The pressure rises to 30 atmospheres. When the reaction is finished, the mixture is filtered and the solid matter washed first with fresh methyl alcohol and then with a little water and is then dried. It contains 83 per cent. of melamine, calculated on the dicyandiamide.

A similar result is obtained when instead of methyl alcohol the corresponding proportion of benzine, nitrobenzene or ethyl alcohol is used.

Example 3

300 grams of dicyandiamide are heated with 300 grams of liquid ammonia in an autoclave for 6 hours at 160° C., the maximum pressure being about 200 atmospheres. The dry residue contains 91 per cent. of melamine calculated on the dicyandiamide.

If instead of commercial dicyandiamide a pure, sharply dried product is used, the other reaction conditions being otherwise the same as indicated in the preceding paragraph, a reaction product is obtained which contains about 98 per cent. of pure melamine calculated on the dicyandiamide used.

Example 4

100 grams of dried dicyandiamide are thoroughly mixed with 150 grams of iron powder and the mixture is charged into a stirring autoclave. After forcing in ammonia gas up to a pressure of 5 atmospheres the autoclave is heated at 200° C. for 1 hour. The pressure rises to about 23 atmospheres in the course of heating. The product contains 77.5 per cent. of melamine calculated on the dicyandiamide.

The process described in the preceding paragraph may also be conducted without adding ammonia. Since a part of the dicyandiamide is decomposed under the conditions of the reaction with formation of ammonia, the reaction also in this case proceeds in presence of ammonia, but the quantity of ammonia is smaller than in the procedure described in the preceding paragraph. The yield is therefore somewhat smaller, namely 66 per cent.

If the quantity of ammonia present during the reaction is further reduced by using an open vessel instead of an autoclave so that a part of the ammonia produced by decomposition of dicyandiamide may escape, the yield sinks to about 50 per cent.

If the process were conducted without a heat buffer and without the use of pressure the yield of melamine would be less than 20 per cent. even if extreme care were observed in the heating operation.

*Example 5*

1 gram of dicyandiamide and 1 gram of copper bronze are intimately mixed and the mixture is heated in a reaction flask on an oil bath at a temperature of 185°–190° C. A reaction soon occurs with the formation of a white sublimate. The melt is comminuted and extracted with water. Melamine is obtained in a yield of 50 per cent. calculated on the dicyandiamide.

It appears that the metals act not only as heat buffers but also as catalysts.

*Example 6*

10 grams of cyanamide and 10 cc. of methyl alcohol, which has been saturated with ammonia gas at 0° C., are heated together in a sealed tube for 12 hours at 150° C. The product contains 73 per cent. of melamine calculated on the cyanamide used.

*Example 7*

10 grams of dicyandiamide and 10 grams of iron powder are ground together and the mixture is maintained in a sealed tube for 1 hour at 205°–210° C. The reaction product, which smells of ammonia, is comminuted and passed through a sieve. From a sample melamine can be obtained in a yield of 66 per cent. calculated on the dicyandiamide.

*Example 8*

400 grams of dicyandiamide and 350 cc. of methyl alcohol are introduced together into an autoclave. Then ammonia is introduced from a cylinder until the pressure in the autoclave amounts to 3 atmospheres. The autoclave is then maintained at a temperature of 110° C. for 44 hours and then cooled. From the contents of the autoclave there can be isolated 264 grams of melamine, that is to say a yield of 64 per cent. calculated on the dicyandiamide.

*Example 9*

1.5 kilos of dicyandiamide and 1 litre of methyl alcohol are introduced into an autoclave. 485 grams of liquid ammonia are then allowed to run in from a cylinder, whereby the pressure in the autoclave at room temperature amounts to 4 atmospheres. The whole is then heated at 120° C. for 12 hours, the maximum pressure amounting to 35 atmospheres. Melamine is obtained in a yield of 78 per cent. calculated on the dicyandiamide.

What we claim is:

1. Process for the manufacture of 2.4.6-triamino-1.3.5-trazine, wherein a cyan derivative of ammonia of the formula $(CN_2H_2)_x$, wherein $x$ represents a whole number not greater than 2, is heated with ammonia at temperatures substantially above 100° C. but not appreciably above 300° C. in presence of at most 10 per cent. of water based on the weight of the cyan derivative used.

2. Process for the manufacture of 2.4.6-triamino-1.3.5-triazine, wherein dicyandiamide is heated with ammonia at temperatures substantially above 100° C. but not appreciably above 300° C. in presence of at most 10 per cent. of water based on the weight of the cyan derivative used.

3. Process for the manufacture of 2.4.6-triamino-1.3.5-triazine, wherein a cyan derivative of ammonia of the formula $(CN_2H_2)_x$, wherein $x$ represents a whole number not greater than 2, is heated with ammonia at temperatures substantially above 100° C. but not appreciably above 300° C. in absence of water.

4. Process for the manufacture of 2.4.6-triamino-1.3.5-triazine, wherein a cyan derivative of ammonia of the formula $(CN_2H_2)_x$, wherein $x$ represents a whole number not greater than 2, is heated with ammonia at temperatures above 100° C. but not appreciably above 300° C. in presence of a substantially anhydrous diluent.

5. Process for the manufacture of 2.4.6-triamino-1.3.5-triazine, wherein a cyan derivative of ammonia of the formula $(CN_2H_2)_x$, wherein $x$ represents a whole number not greater than 2, is heated with ammonia at temperatures above 100° C. but not appreciably above 300° C. in presence of a substantially anhydrous liquid diluent.

6. Process for the manufacture of 2.4.6-triamino-1.3.5-triazine, wherein a cyan derivative of ammonia of the formula $(CN_2H_2)_x$, wherein $x$ represents a whole number not greater than 2, is heated with ammonia at temperatures above 100° C. but not appreciably above 300° C. in presence of a substantially anhydrous solvent.

7. Process for the manufacture of 2.4.6-triamino-1.3.5-triazine, wherein a cyan derivative of ammonia of the formula $(CN_2H_2)_x$, wherein $x$ represents a whole number not greater than 2, is heated with liquid ammonia at temperatures substantially above 100° C. but not appreciably above 300° C.

8. Process for the manufacture of 2.4.6-triamino-1.3.5-triazine, wherein a cyan derivative of ammonia of the formula $(CN_2H_2)_x$, wherein $x$ represents a whole number not greater than 2, is heated with ammonia at temperatures above 100° C. but not appreciably above 300° C. in presence of an organic solvent.

9. Process for the manufacture of 2.4.6-triamino-1.3.5-triazine, wherein a cyan derivative of ammonia of the formula $(CN_2H_2)_x$, wherein $x$ represents a whole number not greater than 2, is heated with ammonia at temperatures above 100° C. but not appreciably above 300° C. in presence of methyl alcohol.

10. Process for the manufacture of 2.4.6-triamino-1.3.5-triazine, wherein a cyan derivative of ammonia of the formula $(CN_2H_2)_x$, wherein $x$ represents a whole number not greater than 2, is heated with ammonia at temperatures above 100° C. but not appreciably above 300° C. in presence of a solid diluent.

11. Process for the manufacture of 2.4.6-triamino-1.3.5-triazine, wherein a cyan derivative of ammonia of the formula $(CN_2H_2)_x$, wherein $x$ represents a whole number not greater than 2, is heated with ammonia at temperatures above 100° C. but not appreciably above 300° C. in presence of a metallic diluent.

12. Process for the manufacture of 2.4.6-triamino-1.3.5-triazine, wherein a cyan derivative of ammonia of the formula $(CN_2H_2)_x$, wherein $x$ represents a whole number not greater than 2, is heated with ammonia at temperatures ranging between 120 and 200° C. in presence of at most 10 per cent. of water based on the weight of the cyan derivative used.

GUSTAVE WIDMER.
WILLI FISCH.
JOSEF JAKL.